(12) United States Patent
Wu

(10) Patent No.: US 9,363,627 B1
(45) Date of Patent: Jun. 7, 2016

(54) RACK SERVER SYSTEM

(71) Applicants: Inventec (Pudong) Technology Corporation, Shanghai (CN); INVENTEC CORPORATION, Taipei (TW)

(72) Inventor: Xu-Xiang Wu, Shanghai (CN)

(73) Assignees: Inventec (Pudong) Technology Corporation, Shanghai (CN); INVENTEC CORPORATION, Taipei (TW)

( * ) Notice: Subject to any disclaimer, the term of this patent is extended or adjusted under 35 U.S.C. 154(b) by 0 days.

(21) Appl. No.: 14/599,537

(22) Filed: Jan. 18, 2015

(30) Foreign Application Priority Data

Nov. 26, 2014 (CN) .......................... 2014 1 0691077

(51) Int. Cl.
*H04B 7/00* (2006.01)
*H04W 4/00* (2009.01)
*H05K 7/20* (2006.01)

(52) U.S. Cl.
CPC ........... *H04W 4/008* (2013.01); *H05K 7/20736* (2013.01)

(58) Field of Classification Search
CPC .......................... H04W 4/008; H05K 7/20736
USPC ................................................ 455/41.2, 41.1
See application file for complete search history.

(56) References Cited

U.S. PATENT DOCUMENTS

| 8,461,725 B1* | 6/2013 | Stubbs | H01H 9/54 307/140 |
|---|---|---|---|
| 8,600,575 B2 | 12/2013 | Weston et al. | |
| 8,989,053 B1* | 3/2015 | Skaaksrud | H04W 12/06 370/255 |
| 2014/0006825 A1* | 1/2014 | Shenhav | G06F 1/3206 713/323 |
| 2014/0250239 A1* | 9/2014 | Lambert | H04L 45/54 709/242 |
| 2015/0069119 A1* | 3/2015 | Hastman | G06Q 10/087 235/385 |
| 2015/0244581 A1* | 8/2015 | Angaluri | H04L 43/065 709/224 |
| 2015/0271271 A1* | 9/2015 | Bullotta | H04L 67/141 709/228 |
| 2015/0350926 A1* | 12/2015 | Uchiyama | H04M 11/00 455/418 |
| 2015/0355699 A1* | 12/2015 | Castro-Leon | G06F 1/30 713/322 |
| 2015/0358831 A1* | 12/2015 | Uchiyama | H04W 24/02 455/446 |

FOREIGN PATENT DOCUMENTS

| CN | 101917053 B | 10/2012 |
|---|---|---|
| TW | M424732 | 3/2012 |

* cited by examiner

*Primary Examiner* — Marceau Milord
(74) *Attorney, Agent, or Firm* — CKC & Partners Co., Ltd.

(57) ABSTRACT

A rack server system and a wireless communication method are disclosed. The rack server system includes a rack management control unit and a server node. The rack management control unit includes a rack management control module and a first ZigBee communication module. The server node includes a first baseboard management control module and a second ZigBee communication module. The rack management control module generates a first serial communication signal. The first ZigBee communication module is electrically coupled with the rack management control module and transforms the first serial communication signal into a first wireless signal. The first baseboard management control module generates a second serial communication signal. The second ZigBee communication module is electrically coupled with the first baseboard management control module and transforms the second serial communication signal into a second wireless signal.

8 Claims, 2 Drawing Sheets

RACK SERVER SYSTEM

RELATED APPLICATIONS

This application claims priority to Chinese Application Serial Number 201410691077.8, filed Nov. 26, 2014, which is herein incorporated by reference.

BACKGROUND

1. Field of Invention

The present disclosure relates to a rack server system. More particularly, the present disclosure relates to a rack server system in which ZigBee wireless communication technology is utilized.

2. Description of Related Art

Conventional server systems include multiple rack server systems, and every rack server system includes multiple baseboards. A rack management controller (RMC) is configured to integrate the working statuses of the multiple baseboards in one rack server system. A baseboard management controller (BMC) is configured to monitor the working statuses of one baseboard.

In conventional server systems, physical wires are utilized to electrically couple between the rack management controllers in each rack server system. In addition, the physical wires are also utilized to electrically couple between the rack management controllers and the baseboard management controllers inside the rack server systems. Switches and network wires are unavoidably required, and these elements occupy space in the rack server systems.

SUMMARY

The following presents a simplified summary of the disclosure in order to provide a basic understanding to the reader. This summary is not an extensive overview of the disclosure and it does not identify key/critical components of the present disclosure or delineate the scope of the present disclosure. Its sole purpose is to present some concepts disclosed herein in a simplified form as a prelude to the more detailed description that is presented later.

One aspect of the present disclosure is to provide a rack server system. The rack server system includes a rack management control unit and at least one server node. The rack management control unit includes a rack management control module and a first ZigBee communication module. The server node includes a baseboard management control module and a second ZigBee communication module. The rack management control module is configured to manage the rack server system, and generate a first serial communication signal. The first ZigBee communication module is electrically coupled with the rack management control module and is configured to transform the first serial communication signal into a first wireless signal. The baseboard management control module is configured to manage the server node, and generate a second serial communication signal. The second ZigBee communication module is electrically coupled with the baseboard management control module and is configured to transform the second serial communication signal into a second wireless signal.

In an embodiment of the present disclosure, the first wireless signal and the second wireless signal are transmitted between the first ZigBee communication module and the second ZigBee communication module.

In an embodiment of the present disclosure, the first serial communication signal and the second serial communication signal are UART signals.

In an embodiment of the present disclosure, the baseboard management control module generates the first serial communication signal according to server log information of the at least one server node.

In an embodiment of the present disclosure, the rack server system further includes a power node. The power node includes a power control module and a third ZigBee communication module. The power control module is configured to generate a power status signal. The third ZigBee communication module is electrically coupled with the power control module and is configured to receive the power status signal and generate a third wireless signal, wherein the first wireless signal and the third wireless signal are transmitted between the first ZigBee communication module and the third ZigBee communication module, and the second wireless signal and the third wireless signal are transmitted between the second ZigBee communication module and the third ZigBee communication module.

In an embodiment of the present disclosure, the power control module generates the power status signal according to power log information, and the power log information includes an output voltage, an output current and a temperature of the power node.

In an embodiment of the present disclosure, the rack server system further includes a fan node. The fan node includes a fan control module and a fourth ZigBee communication module. The fan control module is configured to generate a fan status signal. The fourth ZigBee communication module is electrically coupled with the fan control module and is configured to receive the fan status signal and generate a fourth wireless signal, wherein the first wireless signal and the fourth wireless signal are transmitted between the first ZigBee communication module and the fourth ZigBee communication module, and the second wireless signal and the fourth wireless signal are transmitted between the second ZigBee communication module and the fourth ZigBee communication module.

In an embodiment of the present disclosure, the fan control module generates the fan status signal according to fan log information, and the fan log information includes a fan speed of the fan node.

In an embodiment of the present disclosure, the first wireless signal is transmitted to a fifth ZigBee communication module of a client terminal.

Another aspect of the present disclosure is to provide a rack server system. The rack server system includes at least one rack server system of the above rack server system and a log server, wherein the log server includes a sixth ZigBee communication module, the sixth ZigBee communication module is configured to receive the first wireless signal and generate a fifth wireless signal, and the log server transmits the fifth wireless signal to the fifth ZigBee communication module of the client terminal and the first ZigBee communication module.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
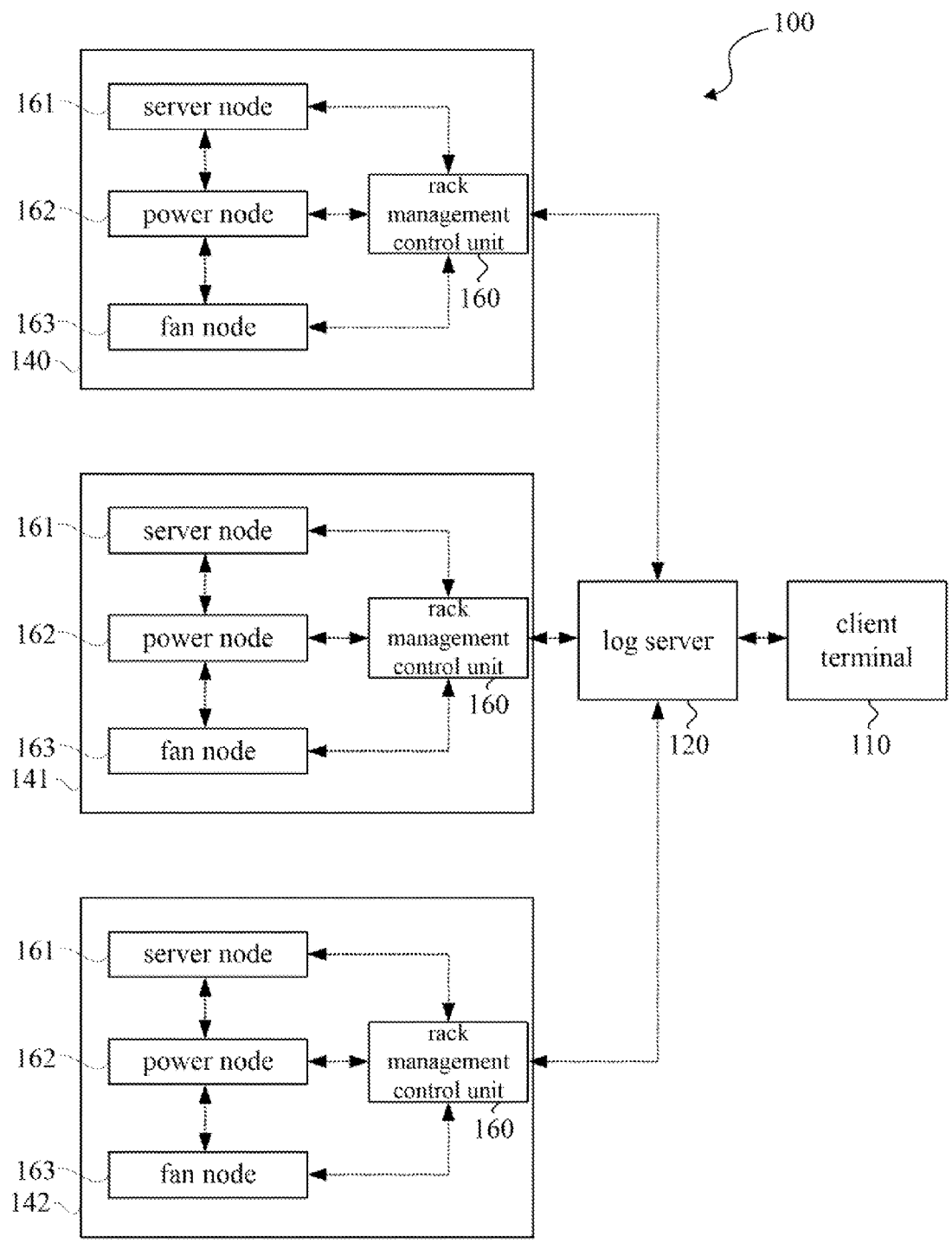
FIG. 1 is a schematic diagram of a server system according to an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a schematic diagram of a server system 100 according to an embodiment of the present disclosure. As shown in FIG. 1, the server system 100 includes a log server 120 and rack server systems 140~142. Each of the rack server systems 140~142 includes a rack management control unit 160, a server node 161, a power node 162 and a fan node 163. In this embodiment, each of the rack server systems 140~142 can include other functional nodes than the server node 161, the power node 162 and the fan node 163, and the present disclosure is not limited in this regard. For example, the rack server systems 140~142 can further include storage modules, control modules or other equivalent modularized circuits. In practice, each of the rack server systems 140~142 can include one or more types of functional modules, and is not limited to the three types in FIG. 1 of this embodiment.

The server node 161, the power node 162 and the fan node 163 generate a significant amount of working status information during operation thereof in the rack server systems 140~142 (e.g., information related to fan speeds, temperatures, voltages, quantities of hard disks, memory capacities, malfunction messages, etc.). This working status information is referred to as log information. In order to manage the log information, the log information is transmitted to the rack management control unit 160, and the rack management control unit 160, in turn, transmits the log information to the log server 120.

In this embodiment, each of the nodes (the server node 161 the power node 162 and the fan node 163) and the rack management control unit 160 are interconnected with each other utilizing ZigBee wireless communication technology. The above log information can be further transformed into wireless signals and transmitted to the rack management control unit 160 by utilizing ZigBee wireless communication technology. It should be noted that the process of transmitting the wireless signals is not limited to direct transmission. Because the nodes are also interconnected with each other by utilizing ZigBee wireless communication technology, the wireless signals can be indirectly transmitted to the rack management control unit 160 (for example, the wireless signals may be transmitted from the server node 161 to the power node 162, and then to the rack management control unit 160). In addition, the rack management control units 160 of the rack server systems 140~142 are connected to the log server 120 also by utilizing ZigBee wireless communication technology. That is to say, the log information received by each of the rack management control units 160 is transmitted to the log server 120 also by utilizing ZigBee wireless communication technology. Therefore, by utilizing ZigBee wireless communication technology in the present disclosure, the use of a large number of network wires and high-cost switches as in the case of prior art configurations can be avoided, and furthermore, space can be saved in the rack server systems 140~142.

Moreover, in order to manage the working statuses of each of the nodes (the server node 161, the power node 162 and the fan node 163), the log server 120 transmits the received log information, which is generated by each of the nodes (the server node 161, the power node 162 and the fan node 163) of the rack server systems 140~142, to a client terminal 110. The client terminal 110 can thus collect the working statuses of each of the nodes instantly, and further deliver a serial communication signal for control according to the different working statuses (e.g., fan speeds, temperatures, voltages, quantities of hard disks, memory capacities, malfunction messages, etc.). For example, the client terminal 110 may deliver a signal for increasing fan speed when the temperature gets too high, a signal for increasing voltage when the voltage gets too low, or a signal for shutting down when a malfunction message is received, etc. Subsequently, the serial communication signal is transformed into a wireless signal and transmitted to the rack management control unit 160 of each of the rack server systems 140~142 by utilizing ZigBee wireless communication technology. The rack management control unit 160 of each of the rack server systems 140~142 can transmit the wireless signals corresponding to each of the nodes (the server node 161, the power node 162 and the fan node 163) to the corresponding nodes also by utilizing ZigBee wireless communication technology. Similarly, the wireless signals can be indirectly transmitted from the rack management control unit 160 of each of the rack server systems 140~142 to the corresponding nodes (for example, transmitted from the rack management control unit 160 to the server node 161 and then to the power node 162).

It is to be noted that the log information can be directly transmitted to the client terminal 110 from the rack management control unit 160 of each of the rack server systems 140~142 without being collected by the log server 120. This is not shown in FIG. 1, but reference may be made to FIG. 2 for illustration of a configuration allowing for such operation.

The ZigBee wireless communication technology in the above embodiment is a low-speed, short-distance wireless network protocol. Communication is achieved by coordination between multiple ZigBee communication modules, that is, by transmitting the wireless signal of information from one ZigBee communication module to another. The ZigBee communication modules use very little energy, and thus, achieve highly efficient communication. In the following description, the server system 100 in one embodiment of the present disclosure will be used to describe how to achieve the above function.

Figure 2:
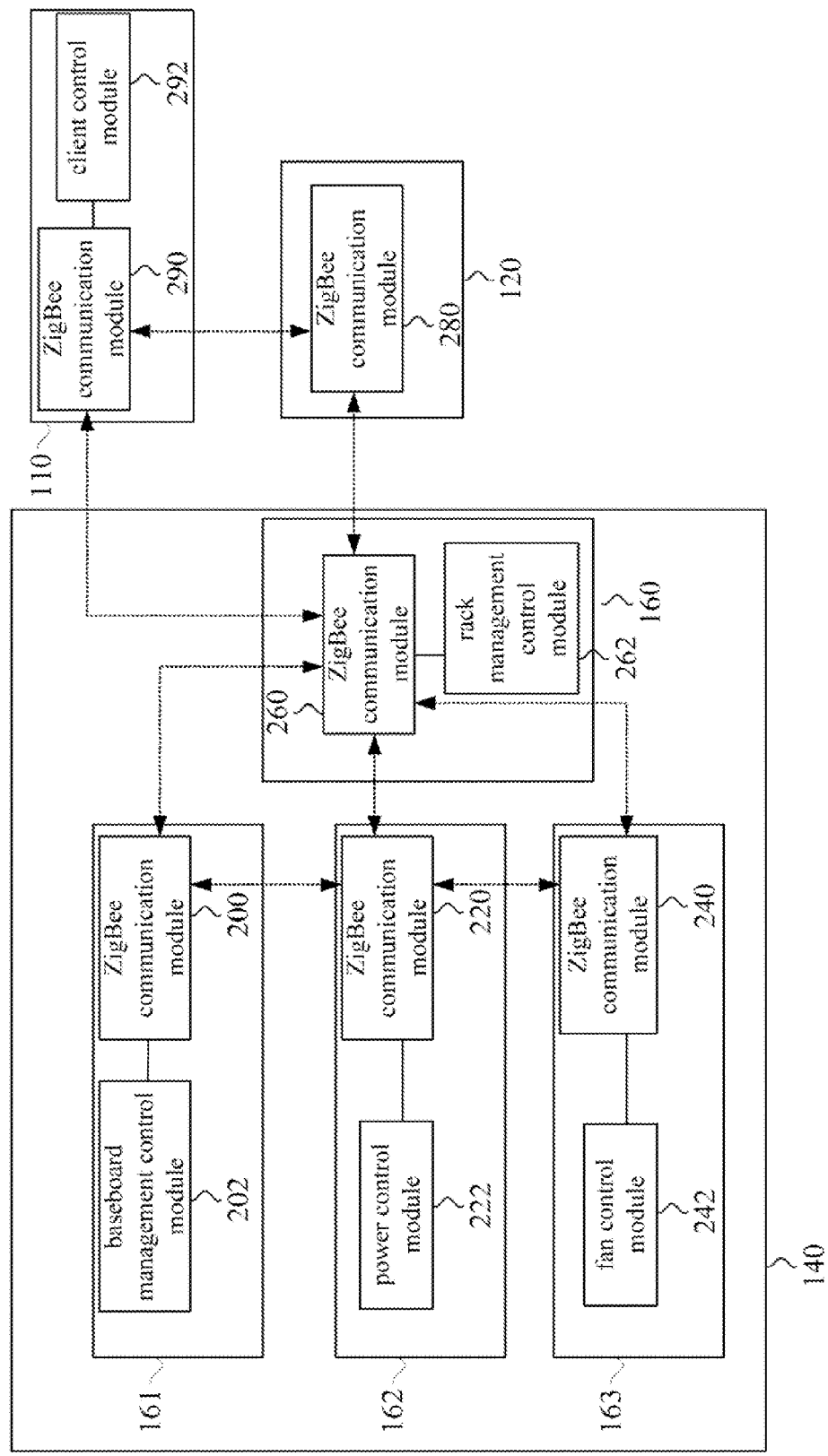
FIG. 2 is a schematic diagram of a rack server system, a log server and a client terminal shown in FIG. 1 according to an embodiment of the present disclosure.

FIG. 2 is a schematic diagram of a rack server system, a log server and a client terminal shown in FIG. 1 according to an embodiment of the present disclosure. As shown in FIG. 2, the server node 161 is a server module including a baseboard management control module 202 and a ZigBee communication module 200. As mentioned above, the server node 161 generates a significant amount of working status information during operation thereof (e.g., information related to temperatures, operating frequencies, quantities of hard disks, memory capacities, malfunction messages of the server node 161, etc.) In this embodiment, the baseboard management control module 202 can be a microcontroller, an application controller, an application processor or another equivalent operation processor.

In this embodiment, the baseboard management control module 202 can include a detecting circuit, such as a temperature detecting circuit, a frequency detecting circuit, a memory detecting circuit or another equivalent detecting circuit, to detect the working status of the server node 161 and obtain the server log information of the server node 161. Therefore, all the different working statuses of the server node 161 are recorded in the server log information.

In addition, the baseboard management control module 202 can generate a serial communication signal in a manner complying with a special digital signal format such as UART, for transmitting the server log information. The ZigBee communication module 200 further includes a signal transforming circuit configured to transform the serial communication signal into a wireless signal that complies with the ZigBee protocol. Next, the ZigBee communication module 200 can transmit the wireless signal, i.e., the server log information, to the ZigBee communication module 260 of the rack management control unit 160. As shown in FIG. 2, the above wireless signal can also be indirectly transmitted to the ZigBee communication module 260 through the ZigBee communication module 220 and the ZigBee communication module 240 as described in the above embodiment, and a description in this regard will not be repeated herein.

As shown in FIG. 2, the rack server management control unit 160 includes a ZigBee communication module 260 and a rack management control module 262. The log server 120 includes a ZigBee communication module 280. The rack server management control unit 160 receives the log information of the server node 161 through the ZigBee communication module 260 (and simultaneously receives the log information of the power node 162 and the fan node 163), and transmits the received log information to the ZigBee communication module 280 of the log server 120.

The log server 120 receives the log information of each node through the ZigBee communication module 280 (i.e., the log information of the server node 161 the power node 162, and the fan node 163 in the rack server system 140). The log server 120 transmits the log information to the ZigBee communication module 290 of the client terminal 110, and the client terminal 110 can thus collect the working status of each node. A client control module 292 further delivers serial communication signals for control according to the different working status of each of the nodes the server node 161, the power node 162 and the fan node 163). The serial communication signals are subsequently transformed into wireless signals and transmitted to the ZigBee communication module 280 of the log server 120 through the ZigBee communication module 290, and the wireless signals are then transmitted to the ZigBee communication module 260 of the rack management control unit 160. The ZigBee communication module 260 of the rack management control unit 160 further transmits the wireless signals to the corresponding nodes. As mentioned above, the log information can be directly transmitted to the ZigBee communication module 290 of the client terminal 110 from the rack management control unit 160 without being collected by the log server 120.

The serial communication signals for control include server control signals (which are configured to increase operating frequencies or shut down the server) and fan control signals (which are configured to increase fan speeds). The rack management control unit 160 transmits these two different types of control signals respectively to the ZigBee communication module 200 of the server node 161 and the ZigBee communication module 240 of the fan node 163. However, the disclosure is not limited in this regard, and the control signals can correspond to one node or multiple nodes simultaneously (e.g., the control signals may correspond simultaneously to the server node and power node, or may correspond simultaneously to the server node, power node, and fan node).

In this embodiment, the baseboard management control module 202 includes a control circuit, such as a temperature compensating circuit, a frequency compensating circuit, a switching circuit or another equivalent control circuit, which is configured to change the working status of the server node 161 (for example, decrease operating frequencies or shut down the server). If the server node 161 receives the control signal for increasing operating frequency, the baseboard management control module 202 increases the operating frequency of the server node 161 using the frequency compensating circuit. If the server node 161 receives the control signal for shutting down the server, the baseboard management control module 202 switches the server node 161 into a standby mode using the switching circuit.

As shown in FIG. 2, the power node 162 is a power supply module including a power control module 222 and a ZigBee communication module 220. The power node 162 generates a significant amount of working status information during operation thereof (e.g., output voltages, output currents, temperatures of the power node 162, etc.)

In this embodiment, the difference between the power control module 222 and the baseboard management control module 202 is that the detecting circuit of the power control module 222 is a voltage detecting circuit, a current detecting circuit, a temperature detecting circuit or another equivalent detecting circuit which is configured to detect the working status of the power node 162 and obtain the power log information of the power node 162. Therefore all the different working statuses of the power node 162 are recorded in the power log information. In addition, the power control module 222 further includes a control circuit, such as a voltage compensating circuit, a current compensating circuit, a power switch-off circuit or another equivalent control circuit, which is configured to change the working status of the power node 162 (for example, increase output voltages, decrease output currents or shut down the power).

The power control module 222, like the baseboard management control module 202, can generate a power status signal which complies with a special digital signal format such as UART for transmitting the power log information. The power status signal is further transformed into a wireless signal complying with the ZigBee protocol by the ZigBee communication module 220. Subsequently, the ZigBee communication module 220 can transmit the wireless signal to the ZigBee communication module 260 of the rack management control unit 160.

As shown in FIG. 2, the fan node 163 is a fan module including a fan control module 242 and a ZigBee communication module 240. The fan node 163 generates a significant amount of working status information during operation thereof (e.g., fan speed of the fan node 163).

In this embodiment, the difference between the fan control module 242 and the baseboard management control module 202 is that the detecting circuit of the fan control module 242 is a fan speed detecting circuit, a current detecting circuit or another equivalent detecting circuit which is configured to detect the working status of the power node 163 and obtain the fan log information of the fan node 163. Therefore, all the different working statuses of the fan node 162 are recorded in the fan log information. In addition, the fan control module 242 further includes a control circuit, such as a current compensating circuit, a power switch-off circuit or another equivalent control circuits, which is configured to change the working status of the fan node 163 (for example, increase fan speed or shut down the fan).

It is to be noted that the above-mentioned determination/generation of the control signal is not limited to that corresponding to the working status information of the same node. For example, when the log information of the server node 161 (server module) indicates an increase in temperature, the client control module 292 generates a control signal corresponding to the fan node 163 (fan module), i.e. a fan control signal, which is configured to drive the fan control module 242 of the fan node 163 and increase fan speed.

The fan control module 242, like the baseboard management control module 202, can generate a fan status signal which complies with a special digital signal format such as UART for transmitting the fan log information. The fan status signal is further transformed into a wireless signal in accordance with the ZigBee protocol by the ZigBee communication module 240. Subsequently, the ZigBee communication module 240 can transmit the wireless signal to the ZigBee communication module 260 of the rack management control unit 160.

The wireless signal is then transmitted to each of the nodes (the server node 161, the power node 162 and the fan node 163) as described in the above embodiment, and so a description in this regard will not be repeated herein. It should be noted that when the control circuits of the baseboard management control modules 202, 222, 242 receive different control signals, the control circuits respectively change the working statuses of the server node 161, the power node 162 and the fan node 163 according to the content of signals and the above-mentioned functions of the control circuits. The working statuses are as described in the above embodiment, and a description in this regard will not be repeated herein.

To summarize, instead of using a large number of network wires and high-cost switches as in the case of prior art configurations, the present disclosure utilizes wireless communication technology to change the traditional interconnections between each node, and thus saves costs related to the switches and space in the rack server systems.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A rack server system, comprising:
   a rack management control unit, comprising:
      a rack management control module, configured to manage the rack server system, and generate a first serial communication signal; and
      a first ZigBee communication module electrically coupled with the rack management control module, the first ZigBee communication module being configured to transform the first serial communication signal into a first wireless signal;
   at least one server node, comprising:
      a baseboard management control module, configured to manage the server node, and generate a second serial communication signal;
      a second ZigBee communication module electrically coupled with the baseboard management control module, the second ZigBee communication module being configured to transform the second serial communication signal into a second wireless signal; and
   a power node, comprising:
      a power control module, configured to generate a power status signal; and
      a third ZigBee communication module electrically coupled with the power control module, the third ZigBee communication module being configured to receive the power status signal and generate a third wireless signal, wherein the first wireless signal and the third wireless signal are transmitted between the first ZigBee communication module and the third ZigBee communication module, and the second wireless signal and the third wireless signal are transmitted between the second ZigBee communication module and the third ZigBee communication module.

2. The rack server system of claim 1, wherein the first wireless signal and the second wireless signal are transmitted between the first ZigBee communication module and the second ZigBee communication module.

3. The rack server system of claim 1, wherein the first serial communication signal and the second serial communication signal are UART signals.

4. The rack server system of claim 1, wherein the baseboard management control module generates the first serial communication signal according to server log information of the at least one server node.

5. The rack server system of claim 1, wherein the power control module generates the power status signal according to power log information, and the power log information comprises an output voltage, an output current and a temperature of the power node.

6. The rack server system of claim further comprising:
   a fan node, comprising:
      a fan control module, configured to generate a fan status signal; and
      a fourth ZigBee communication module electrically coupled with the fan control module, the fourth ZigBee communication module being configured to receive the fan status signal and generate a fourth wireless signal, wherein the first wireless signal and the fourth wireless signal are transmitted between the first ZigBee communication module and the fourth ZigBee communication module, and the second wireless signal and the fourth wireless signal are transmitted between the second ZigBee communication module and the fourth ZigBee communication module.

7. The rack server system of claim 6, wherein the fan control module generates the fan status signal according to fan log information, and the fan log information comprises a fan speed of the fan node.

8. The rack server system of claim 1, wherein the first wireless signal is transmitted to a fifth ZigBee communication module of a client terminal.

\* \* \* \* \*